(No Model.)
H. R. WELLMAN.
ANTIFRICTION BEARING.
No. 556,450. Patented Mar. 17, 1896.
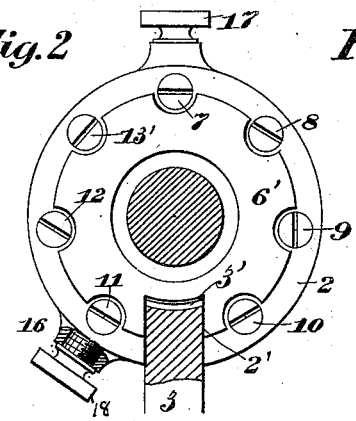
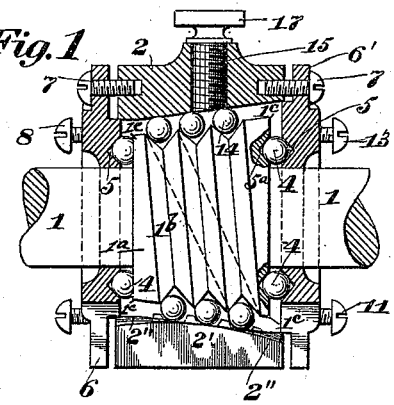
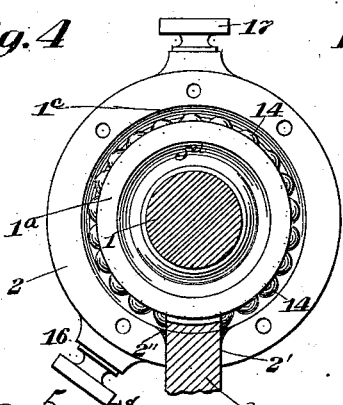
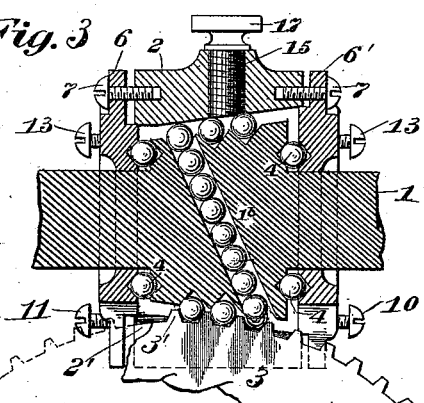
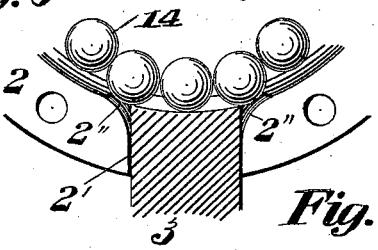
WITNESSES:
INVENTOR:
Harold R. Wellman
By W. S. Boyd,
Attorney.

UNITED STATES PATENT OFFICE.

HAROLD R. WELLMAN, OF DULUTH, MINNESOTA.

ANTIFRICTION-BEARING.

SPECIFICATION forming part of Letters Patent No. 556,450, dated March 17, 1896.

Application filed March 11, 1893. Serial No. 465,628. (No model.)

*To all whom it may concern:*

Be it known that I, HAROLD ROBINSON WELLMAN, a citizen of the United States, residing at the city of Duluth, in the county of St. Louis and State of Minnesota, have invented a new and useful Improvement in Antifriction-Bearings, of which the following is a specification.

My invention relates to what are known as "antifriction-bearings," and more particularly to those in which a worm or screw is used with a gear or rack, and has for its object to produce such a bearing as will be simple, compact, and efficient; and it consists in constructing and combining the parts of the same as will be hereinafter more particularly set forth.

Referring to the accompanying drawings, in which the same reference-numerals indicate corresponding parts in each of the views, Figure 1 is a broken end elevation of a machine embodying my invention. Fig. 2 is a longitudinal vertical sectional view of the same, the shaft being shown in full line and the gear omitted. Fig. 3 is a similar view with the shaft shown in section and a portion of the gear-wheel being shown in broken, full, and dotted lines. Fig. 4 is an end view similar to Fig. 1 with the end of the casing removed, and Figs. 5 and 6 are enlarged detailed views.

In carrying out my invention I provide a shaft 1, a portion of which, as 1$^a$, is tapered and provided with a screw-thread or with a spiral groove or channel 1$^b$, and which is inclosed within the casing 2. I provide the shaft with shoulders 1$^c$, preferably by enlarging that portion of the shaft, as shown in Figs. 1, 3, and 4. The interior or bore of the casing is tapered to correspond with the taper of the screw-threaded portion of the shaft, and is made larger than the diameter of the shaft to permit of the insertion of the balls or antifriction-bearings 14 between it and the shaft. A slot 2' is cut in one side of the casing, through which the toothed part, as a worm-gear 3, projects to be moved by the rotation of the shaft. As the line or edge formed upon the inside of the casing by cutting a slot in one side is straight and would be tangential to the arc or periphery of a worm-wheel, it is necessary to cut off a portion of the edge of the casing, as shown at 2'' in Figs. 1, 4, and 5, so as to conform with the curvature of the gear-wheel, and as the toothed part virtually forms a continuation of the bore of the casing at this point it is preferably made slightly concaved, as at 3', to correspond with the size of the bore, so that as the balls pass around upon the interior they can pass into and out of engagement with the teeth of the gear or rack, as though it formed a part of the casing.

To avoid any unnecessary friction by having the balls come in contact with too many points of the teeth I prefer to make them of such a size relatively to the teeth that when they are in engagement therewith each ball will only touch one tooth and the bottom or portion between the teeth, and therefore will move clear of the adjacent tooth, as shown in Fig. 6. Of course the tooth that is engaged by the ball will depend upon which way the shaft is being rotated, and also whether the shaft is driving the toothed part or is driven by it.

As it is frequently necessary in devices of this kind to change the position of the screw-thread or groove relatively to the teeth of the gear-wheel, to compensate for wear, &c., I prefer to provide the casing with means for accomplishing this purpose. One way of doing this is by providing the casing with movable ends or heads 6 and 6', which can be moved toward or away from their respective ends by means of the screws or bolts 7, 8, 9, 10, 11, 12, and 13, a portion of which enter the casing and draw the heads toward it, while the others have their ends resting against the casing and will force the heads away. By properly adjusting these screws the heads may be so adjusted to the casing as to hold the shaft in its desired position to the worm-gear, so as to get the proper clearance between the screw-threads of the shaft and the teeth of the gear and permit the balls to pass between them and accomplish their work without becoming displaced or caught in any manner; but unless some means were employed to overcome the friction between the shoulders on the shaft or the ends of the enlarged portion and the heads of the casing the efficiency of the device would be materially lessened. One means for accomplishing this is to provide the shoulders or ends of the enlarged portion and the heads with similar annular grooves 5 and 5ª, respectively, and placing within these grooves a series of balls 4 at each end of the threaded portion, whereby the end thrust of the shaft is taken up by these balls and a very desirable result is obtained.

For placing the balls 14 in the casing I provide the casing with a channel or opening 15, which is closed by a plug 17, while for removing the balls the casing is provided with a similar channel or opening 16 at the lowest point, which is closed by a plug 18. The balls are returned from one end of the spiral channel or screw-thread of the shaft to the other by a diagonal by-pass or through the casing, as is shown in my pending application, Serial No. 459,831; but as such construction forms no part of the present application I have not shown it in this case except by dotted lines in Fig. 1.

Although I intend using my improved bearing in motors for running elevators, street-cars, and such mechanism where the shaft is operated by a motor or otherwise, it is evident that it may be used in other combinations, and I reserve to myself the right to make such changes or alteration as will come within the spirit of my invention.

Having thus described my invention, I claim—

1. In combination, a shaft, a portion of which is tapered and provided with a spiral channel or screw-thread, a casing, the bore of which is tapered to correspond with the shaft, a toothed part projecting into said casing, balls within the casing and between the shaft and the toothed part, and means for changing the position of the threaded portion of the shaft, longitudinally, relatively, to the toothed part, substantially as set forth.

2. In combination, a shaft provided with an enlarged portion, the periphery of which is tapered and screw-threaded, a casing, the bore of which is tapered to correspond with the tapered portion of the shaft, a toothed part projecting into the casing, and balls between the shaft and the casing and the toothed part, substantially as set forth.

3. In combination, a shaft provided with an enlarged portion, the periphery of which is tapered and screw-threaded, a casing, the bore of which is tapered to correspond with the tapered portion of the shaft, a toothed part projecting into the casing, balls between the shaft and the casing and the toothed part, and anti-friction devices between the ends of the enlarged portion of the shaft and the ends of the casing, substantially as set forth.

4. In combination, a shaft provided with an enlarged portion, the periphery of which is tapered and screw-threaded, a casing, the bore of which is tapered to correspond with the tapered portion of the shaft, and the ends of which are movable toward and from the casing, a toothed part projecting into the casing, balls between the shaft and the casing and the toothed part, and means for moving the heads of the casing, and thereby adjusting the position of the screw-threaded portion of the shaft, longitudinally, relatively to the toothed part, substantially as set forth.

5. In combination, a shaft provided with an enlarged portion, the periphery of which is tapered and screw-threaded, and the ends are each provided with an annular groove, a casing, the bore of which corresponds with the tapered portion of the shaft, and the ends are each provided with an annular groove to correspond with the groove of the enlarged portion of the shaft, a toothed part projecting into the casing, and balls within the grooves and the ends of the enlarged portion of the shaft, and also between it and the casing and the toothed part, substantially as set forth.

6. In combination, a shaft, provided with an enlarged portion, the periphery of which is tapered and screw-threaded, and the ends are each provided with an annular groove, a casing, the ends of which are movable toward and away therefrom and are each provided with an annular groove to correspond with the groove in the end of the enlarged portion of the shaft, a series of screws or bolts through each end, a portion of which engage with the casing and the others only rest against it, a toothed part projecting into the casing, and balls within the grooves at the ends of the enlarged portion of the shaft and also between it and the casing and the toothed part, substantially as set forth.

7. In combination, a shaft provided with a tapered and screw-threaded portion, a casing, the bore of which corresponds with the tapered portion of the shaft, a toothed part projecting into the casing, the surface or periphery of which is concaved to correspond with the curvature of the bore of the casing and is located in alignment therewith, and balls between the shaft and the casing and the toothed part, the size of the balls being such that they will only bear against the side of one tooth and the portion of said toothed part between said tooth and the next adjacent tooth, substantially as set forth.

8. In combination, a shaft provided with an enlarged portion, the periphery of which is screw-threaded, a casing around the enlarged portion, one side of which is slotted, a toothed part through said slot, balls between the shaft and the casing and the toothed part, and means for adjusting the position of the shaft longitudinally relatively to the toothed part, substantially as set forth.

9. In combination, a shaft provided with an enlarged portion, the periphery of which is tapered and screw-threaded, a casing around the enlarged portion, the bore of which is tapered to correspond with the tapered portion of the shaft, and one side is slotted, a gear-wheel projecting through said slot, balls between the shaft and the casing, and the gear-wheel, the inner edge of the casing formed by cutting the slot being curved to conform to the curvature of the periphery of the gear-wheel, substantially as set forth.

HAROLD R. WELLMAN.

Witnesses:
H. S. MOODY,
ELLSWORTH BENHAM.